(12) United States Patent
Limberg

(10) Patent No.: US 6,507,626 B1
(45) Date of Patent: Jan. 14, 2003

(54) BANDPASS PHASE TRACKER THAT AUTOMATICALLY SAMPLES AT PRESCRIBED CARRIER PHASES WHEN DIGITIZING VSB I-F SIGNAL

(75) Inventor: Allen LeRoy Limberg, Vienna, VA (US)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/396,446

(22) Filed: Sep. 15, 1999

Related U.S. Application Data (60) Provisional application No. 60/101,799, filed on Sep. 25, 1998.

(51) Int. Cl.[7] ............................................. H04N 3/27
(52) U.S. Cl. ................. 375/321; 375/355; 438/537; 438/726; 438/735; 329/357; 329/361
(58) Field of Search ........................... 375/270, 321, 375/340, 355; 348/537, 553, 725, 726, 735; 329/357, 361

(56) References Cited

U.S. PATENT DOCUMENTS 6,275,554 B1 * 8/2001 Bouillet et al. ............ 375/321
6,333,767 B1 * 12/2001 Patel et al. ................. 348/470
6,351,290 B1 * 2/2002 Limberg ..................... 348/555

* cited by examiner

*Primary Examiner*—Amanda T. Le
(74) *Attorney, Agent, or Firm*—Sughrue Mion, PLLC (57) ABSTRACT

A bandpass phase tracker automatically samples at prescribed carrier phases when digitizing a vestigial-sideband intermediate-frequency signal, which VSB I-F signal is modulated in accordance with a baseband symbol code of a prescribed symbol frequency. Heterodyning circuitry mixes oscillations from a local oscillator with the VSB I-F signal received from the I-F amplifier to generate an analog low-frequency heterodyne signal offset from zero frequency. The heterodyne signal is digitized in accordance with a first sampling clock signal to supply input signal for digital demodulation circuitry that demodulates the VSB I-F signal to supply real and imaginary components of a demodulated signal at baseband. The real component of the demodulated signal is supplied to an equalizer and symbol decoded; the imaginary component controls the frequency and phase of the local oscillator. Envelope variations in the VSB I-F signal envelope close to a submultiple of the prescribed symbol frequency are detected and are used in sample clock generating circuitry to control generation of the first sampling clock signal and a second sampling clock signal, each at a respective controlled rate. A carrier signal generator generates the digital carrier signal the frequency of which is controlled responsive to the second sampling clock signal.

27 Claims, 8 Drawing Sheets

BANDPASS PHASE TRACKER THAT AUTOMATICALLY SAMPLES AT PRESCRIBED CARRIER PHASES WHEN DIGITIZING VSB I-F SIGNAL

This application is filed under 35 U.S.C. 111(a) claiming pursuant to 35 U.S.C. 119(e)(1) benefit of the filing date of provisional application Ser. No. 60/101,799 filed pursuant to 35 U.S.C. 111(b) on Sep. 25, 1998.

The invention relates to digital television receivers for vestigial-sideband (VSB) digital television (DTV) signals and, more particularly, to the portions of such receivers used for recovering baseband symbol coding proceeding from intermediate-frequency signals.

BACKGROUND OF THE INVENTION

The digitization of intermediate-frequency VSB DTV signal and its subsequent demodulation in the digital regime are described in U.S. Pat. No. 5,479,449. This patent entitled "DIGITAL VSB DETECTOR WITH BANDPASS PHASE TRACKER, AS FOR INCLUSION IN AN HDTV RECEIVER" issued Dec. 26, 1995 to C. B. Patel and A. L. R. Limberg. Demodulation in the digital regime is performed in U.S. Pat. No. 5,479,449 by converting the digitized intermediate-frequency VSB DTV signal to complex form to be multiplied in a complex digital multiplier by a complex digital carrier signal supplied from look-up tables stored in read-only memory (ROM). To facilitate converting the digitized I-F signal to complex form using a digital Hilbert transform filter, the final intermediate-frequency band is offset a megahertz (MHz) or so from zero frequency, but its uppermost frequency is kept lower than 10 MHz.

Equalization of the digitized baseband symbol coding that results from demodulation is facilitated by choosing a sampling clock of a rate that is a rational multiple of the symbol rate (i. e., is related to symbol rate by a whole number ratio) and that will satisfy the Nyquist criterion. Supplying the complex digital carrier signal from ROM is facilitated by choosing the carrier in the digitized I-F signal to be a submultiple of the system clock signal rate as described by C. B. Patel and A. L. R. Limberg in U.S. Pat. No. 5,606,579 issued Feb. 25, 1997 and entitled "DIGITAL VSB DETECTOR WITH FINAL I-F CARRIER AT SUBMULTIPLE OF SYMBOL RATE, AS FOR HDTV RECEIVER". Such choice of carrier permits perfect wrap-around of cycles of digital carrier when they are conceived as being mapped to the surface of a cylinder with circumference measured by ROM addresses according to a modular arithmetic.

C. B. Patel and A. L. R. Limberg advocate the digital carrier being located at the upper-frequency end of the final I-F signal band in U.S. Pat. No. 5,731,848 issued Mar. 24, 1998 and entitled "DIGITAL VSB DETECTOR WITH BANDPASS PHASE TRACKER USING NG FILTERS, AS FOR USE IN AN HDTV RECEIVER". That is, the vestigial sideband is above full sideband in frequency in the final I-F signal that is digitized. U.S. Pat. No. 5,731,848 discloses there is reason for this choice of carrier, aside from facilitating the use of Ng filters for converting the real final I-F signal to complex form after its digitization. Fast changes in symbol values are converted to lower-frequency variations in the final I-F signal offered for digitization, which alleviates problems of accurately sampling the final I-F signal as the initial step in digitization. Small changes in sampling phase result in larger changes in the zero-frequency demodulated carrier, so there is tighter automatic frequency and phase control (AFPC) of a local oscillator used in converting the radio-frequency (R-F) VSB DTV signal to the final I-F signal.

The equalization of quadrature amplitude-modulation (QAM) digital signals had been a topic of extensive study before digital television broadcasting standards were being formulated in the early 1990's. The problems of carrier acquisition and of symbol synchronization were separately considered. If synchrodyning is performed in the analog regime and symbol synchronization is performed in the digital regime, this is a natural dichotomy. If the carrier frequency is not locked to symbol rate, this is a natural dichotomy as well. One general approach to receiver design was to demodulate two mutually orthogonal phases of received QAM using a beat frequency oscillator with highly stabilized frequency and with symbol synchronization being performed after demodulation using adaptive equalization techniques based on errors detected from decision results.

An alternative general approach to receiver design was to demodulate two mutually orthogonal phases of received QAM using an oscillator subject to automatic frequency and phase control based on errors detected from decision results. This latter approach was adapted in the Patel et alii patents described above, the phase of digital carrier being adjusted by a method similar to that described by S. U. H. Qureshi in his paper "Timing Recovery For Equalized Partial-Response Systems", IEEE Transactions On Communications, December 1976, pp.1326–1330.

When automatic frequency and phase control (AFPC) of the local oscillator is based on errors detected from decision results, passband equalization, rather than baseband equalization, is preferred by those skilled in the art of digital communications receiver design. Baseband equalization is carried out after demodulation, so the equalization filters are included in the feedback loop used for AFPC of the local oscillator based on errors detected from decision results. Changes in the filter coefficients of an adaptive equalization filter affect loop delay and can cause jitter in carrier synchronization unless the loop bandwidth is kept narrow. Narrow loop bandwidth compromises the ability to acquire carrier rapidly when first tuning to a transmission channel and the ability to synchronize to shifts in carrier phasing during multipath reception. Passband equalization is carried out previous to demodulation, which avoids the equalization filters being included in the feedback loop used for AFPC of the local oscillator based on errors detected from decision results. A problem with passband equalization is encountered when adaptive equalization filters are used. The error signal based on errors detected from decision results must be modulated onto the digital carrier to convert it from the lowpass filter regime into the bandpass filter regime in which filter coefficient adjustments are to be made. This problem is merely an inconvenience with QAM, which has a symmetrical passband structure. But the problem is more difficult with VSB, which has an asymmetrical passband structure.

The extraction from ROM of digital carrier of a frequency that is a submultiple of symbol rate or is a submultiple of symbol rate of a multiple of symbol rate ties together the problems of carrier synchronization and symbol synchronization in a way that previously has not been fully appreciated. The digital carrier is sampled in a prescribed way in the ROM, and the AFPC of the local oscillator so the final I-F signal can be synchrodyned to baseband automatically controls the timing of sampling vis-à-vis the carrier of the analog final I-F signal. So, adjustment of symbol synchronization after the digital complex demodulation of baseband symbol coding is not required, there being no need to overcome randomness of sampling phase versus the phasing of the carrier used in the synchrodyning procedure. However, symbol synchronization may be imperfect because of lack of uniform group delay across the receiver passband, which will be the case when multipath reception occurs. Any adjustment of symbol synchronization that is actually required in practice can be taken care of by the equalization filtering. In order to keep equalization filtering from being included in the AFPC loop in the bandpass tracker, baseband equalization is employed in the invention described below, rather than passband equalization being employed.

There is still need for stabilization of sample clock rate to lock its phase to symbol rate or a multiple thereof. This is required for maintaining perfect wrap-around of cycles of digital carrier when conceptually they are mapped to the surface of a cylinder with circumference measured by ROM addresses sequentially addressed at sample clock rate. Sample clock rate stabilization can be done by extracting half-symbol-frequency component from symbol coding and multiplying up in frequency to generate sampling frequency. Such procedures for stabilization of sample clock rate are per se already known in digital communications receiver design. These procedures are improved by extracting half-symbol-frequency component from symbol coding in the digital regime, using a digital bandpass filter. This avoids the problems with rapid changes in phase response across the passband of an analog bandpass filter for extracting half-symbol-frequency component from symbol coding.

SUMMARY OF THE INVENTION

The invention is embodied in a bandpass phase tracker for automatically sampling at prescribed carrier phases when digitizing a vestigial-sideband intermediate-frequency signal received from an intermediate-frequency amplifier, which said vestigial-sideband I-F signal is modulated in accordance with a baseband symbol code of a prescribed symbol frequency. A local oscillator is included in this bandpass phase tracker for generating analog oscillations at a frequency and phase subject to control responsive to an automatic frequency and phase control signal. The bandpass phase tracker includes heterodyning circuitry for mixing oscillations from the local oscillator with the VSB I-F signal received from the I-F amplifier to generate an analog low-frequency heterodyne signal with its lowest frequencies offset from zero frequency. The bandpass phase tracker includes analog-to-digital conversion circuitry for sampling the analog low-frequency heterodyne signal in accordance with a first sampling clock signal and converting the resulting samples to a complex digital low-frequency heterodyne signal having real and imaginary components. The bandpass phase tracker includes digital demodulation circuitry for synchrodyning the complex digital low-frequency heterodyne signal with a complex digital carrier signal, thereby to complete demodulation of the VSB I-F signal to supply real and imaginary components of a demodulated signal at baseband. Circuitry responsive to the imaginary component of the demodulated signal is provided for generating an automatic frequency and phase control signal for the local oscillator. The bandpass phase tracker includes an envelope detector for detecting envelope variations in the VSB IF signal received from the I-F amplifier to supply an envelope detector response and a frequency-selective filter for receiving the envelope detector response as its input signal. This frequency-selective filter selectively responds in its output signal to frequencies in its input signal that are proximate to a submultiple of the prescribed symbol frequency. The bandpass phase tracker includes sample clock generating circuitry for responding to the submultiple of said prescribed symbol rate contained in the output signal from the frequency-selective filter to generate the first sampling clock signal and a second sampling clock signal, each at a respective controlled rate that is a rational multiple of that submultiple of the prescribed symbol rate. The bandpass phase tracker also includes a carrier signal generator for generating the digital carrier signal for synchrodyning with the complex digital low-frequency heterodyne signal, with the frequency of the digital carrier being controlled by the second sampling clock signal.

In some embodiments of the invention the digital demodulation circuitry comprises a complex digital multiplier for synchrodyning the complex digital low-frequency heterodyne signal to baseband by multiplying it by a complex digital carrier signal. In these embodiments of the invention the carrier signal generator comprises a sample counter, for counting the sample periods in the second sampling clock signal to supply a modular count, and read-only memory addressed by the modular count, for generating real and imaginary components of the complex digital carrier signal.

In other embodiments of the invention the digital demodulation circuitry is simpler, comprising first and second complementors that respond to a modulo-two count of the sample periods in said second sampling clock signal. The first complementor is for generating the real component of the demodulated signal by selectively complementing the real component of the complex digital low-frequency heterodyne signal. The second complementor is for generating the imaginary component of the demodulated signal by selectively complementing the imaginary component of the complex digital low-frequency heterodyne signal.

DETAILED DESCRIPTION

At various points in the circuits shown in the FIGURES of the drawing, shimming delays have to be inserted in order that the sequence of operation is correct, as will be understood by those skilled in electronic design. Unless there is something extraordinary about a particular shimming delay requirement, it will not be explicitly referred to in the specification that follows.

Figure 1:
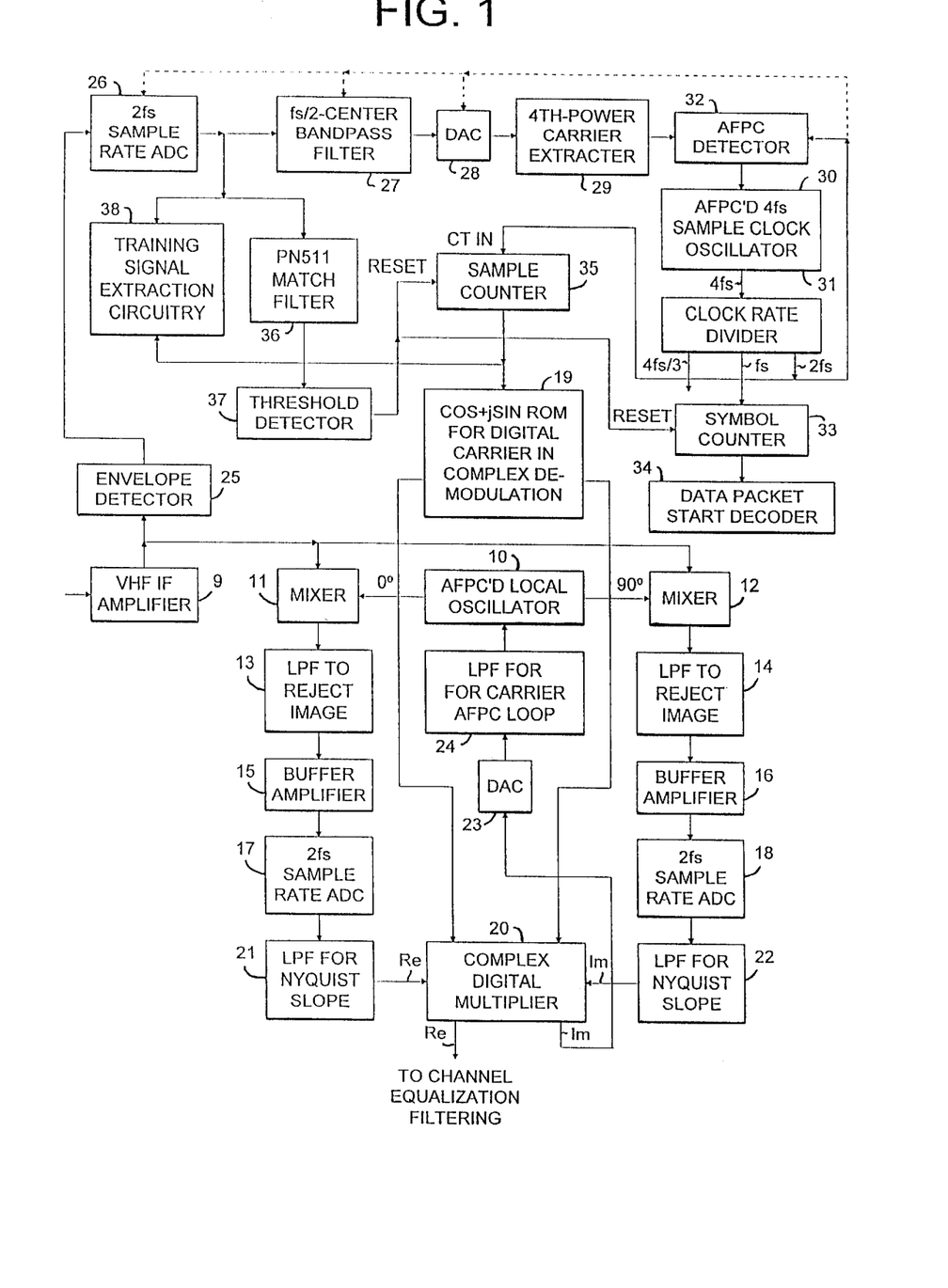
FIG. 1 is a block schematic diagram of portions of a vestigial-sideband digital television receiver embodying the invention, which VSB DTV receiver portions generate complex final intermediate-frequency signals, which are digitized by complex analog-to-digital conversion circuitry for demodulation in the digital regime at twice symbol rate.

FIG. 1 shows portions of a VSB DTV receiver operated with a sampling clock of a frequency $2f_S$, which is twice the 10.76 MHz symbol frequency $f_S$ used in the received VSB DTV signals. A VSB DTV signal received over a transmission channel in the ultra-high-frequency (UHF) band typically is superheterodyned to UHF intermediate-frequency signal in an initial upconversion. Surface-acoustic-wave (SAW) filtering on gallium-arsenide substrates facilitates the suppression of adjacent channel signals. The SAW filter response is usually downconverted to a very-high-frequency intermediate-frequency signal. FIG. 1 shows a very-high-frequency intermediate-frequency amplifier 9 receiving this VHF I-F signal as input signal. The VHF I-F amplifier 9 contains a number of automatic-gain-controlled amplifier stages and supplies an output signal of controlled amplitude to a first mixer 11 and to a second mixer 12 for downconversion to a complex signal in a medium- and high-frequency band in the range of one to ten megahertz. A local oscillator 10 supplies an in-phase carrier at a frequency somewhat above the VHF I-F band to the first mixer 11 and a quadrature-phase carrier of the same frequency to the second mixer 12 for implementing this complex downconversion of the VHF I-F amplifier 9 output signal. The frequency and phase of the oscillations from this local oscillator 10 are subject to automatic frequency and phase control (AFPC). In accordance with the invention, the AFPC of the oscillator 10 implements sampling of the VHF I-F signal at prescribed phases of the carrier when digitizing that VHF I-F signal.

Lowpass analog filters 13 and 14 select the components of this complex final intermediate-frequency signal from the output signals of the mixers 11 and 12, but suppress the image components in the complex signal. Buffer amplifiers 15 and 16 supply output signals to analog-to-digital converters 17 and 18 in response to the output signals of the filters 13 and 14. The ADCs 17 and 18 sample at a rate $2f_S$ twice the symbol rate $f_S$ and digitize the complex final I-F signal in preparation for its being synchrodyned to baseband in the digital regime. The complex digital carrier used for such synchrodyning is supplied from a read-only memory 19 to a complex digital multiplier 20 as its multiplier input signal. The complex digital multiplier 20 is the demodulator used to synchrodyne the complex final I-F signal to baseband. The responses of the ADCs 17 and 18 are lowpass filtered by finite-impulse-response digital filters 21 and 22. The FIR digital lowpass filters 21 and 22 supply a complex final I-F signal, the real and imaginary components of which exhibit similar system characteristics with Nyquist slope responses that are 3 dB down at final I-F carrier frequency. The FIR digital lowpass filters 21 and 22 supply this complex final I-F signal to the complex digital multiplier 20 as its multiplicand input signal.

The complex digital multiplier 20 supplies a complex baseband output signal. The imaginary component of this complex digital signal is supplied to a digital-to-analog converter 23 for conversion to an analog signal applied as input signal to a lowpass analog filter 24. The response of the lowpass analog filter 24 to the imaginary component of the complex digital multiplier 20 output signal is supplied to the local oscillator 10 as its automatic frequency and phase control (AFPC) signal. The AFPC signal is operative to adjust the frequency and phase of the oscillations of the local oscillator 10 to zero the direct component of the imaginary output signal from the complex digital multiplier 20. This maximizes the direct component of the real output signal from the complex digital multiplier 20, which is supplied to channel equalization filtering not shown in FIG. 1.

Fractionally spaced baseband equalization is preferred. Structures for fractionally spaced baseband equalization are described in U.S. patent application Ser. No. 09/373,588 titled "ADAPTIVE FRACTIONALLY SPACED EQUALIZER FOR RECEIVED RADIO TRANSMISSIONS WITH DIGITAL CONTENT, SUCH AS DTV SIGNALS" filed August 1999 for A. L. R. Limberg and C. B. Patel.

The digital lowpass filters 21 and 22 suppress noise at frequencies above the vestigial sideband that originates in the VHF I-F amplifier 9 and otherwise would accompany the complex final I-F signal supplied to the complex multiplier 20. Such noise would be synchrodyned to baseband where it would undesirably be superposed on baseband symbol coding. Designing the lowpass analog filters 13 and 14 with cut-off frequencies low enough to suppress the noise at frequencies above the vestigial sideband that originates in the VHF I-F amplifier 9 is infeasible because uniform delay in phase response near the final I-F carrier is practically impossible to achieve. Linear phase response is achieved in FIR digital filters 21 and 22 simply by using symmetrical kernels. The spectrum folding that attends synchrodyning then tends to result in flat spectral response near zero frequency. This lessens the number of taps required in baseband channel equalization filtering to permit sufficient low-frequency adjustments to overcome the effects of non-uniform delay in phase response near the final I-F carrier.

In order that the bandpass tracker apparatus can automatically sample at a prescribed carrier phasing when digitizing VSB I-F signal, synchronization of the sampling circuitry to symbol rate of received VSB DTV signal is done independently of the bandpass tracker apparatus. Such synchronization can be achieved using the spectral line method for passband signals, sometimes referred to as "envelope derived timing". FIG. 1 shows apparatus for implementing a preferred spectral line method. An envelope detector 25 is used for detecting the envelope variations of the VHF I-F signal supplied from the VHF I-F amplifier 9. Detecting the envelope variations of the VHF I-F signal, rather than the envelope variations of the final I-F signal in the low- and medium-frequency band, simplifies the filtering to suppress carrier remnants in the envelope detector output signal. An analog-to-digital converter 26 samples the envelope detector output signal at the rate $2f_S$ twice the symbol rate $f_S$, to generate input signal for an FIR digital bandpass filter 27. The digital bandpass filter 27 has a passband centered at $f_S/2$ for extracting a spectral line near 5.38 MHz. The $2f_S$ sample rate in the ADC 26 samples the $f_S/2$ spectral line component four times per cycle so that complete phase information is preserved in the digital samples that the FIR digital bandpass filter 27 supplies to a digital-to-analog converter 28. The analog output signal from the DAC 28 containing the $f_S/2$ spectral line selected by the digital bandpass filter 27 is supplied to a non-linear circuit 29 that generates an output signal that is the fourth power of that spectral line. By way of example, the non-linear circuit 29 comprises a cascade of two analog squaring circuits with respective resistance-coupled output ports; several equivalents are known in the art.

A sample clock oscillator 30 oscillates at $4f_S$ and supplies its oscillations to a clock rate divider network 31 that generates sampling clock signals at $f_S$ sample rate and $2f_S$ sample rate. If sampling clock signals at $4f_S/3$ sample rate are used in fractional channel equalization filtering of the real component of the complex digital multiplier 20 output signal, the clock rate divider network 31 is designed to generate these sampling clock signals as well. An automatic frequency and phase detector 32 applies automatic frequency and phase (AFPC) signal to the sample clock oscillator 30 for synchronizing its oscillations with symbols of the currently received VSB DTV signal. More particularly, $2f_S$ sample rate signal from the clock rate divider network 31 is supplied to the AFPC detector 32 for comparison with the non-linear circuit 29 output signal. The non-linear circuit 29 output signal is a $2f_S$ signal that is the fourth power of the $f_S/2$ spectral line selected by the digital bandpass filter 27. The AFPC loop comprising elements 30, 31 and 32 locks the $2f_S$-sample-rate signal from the clock rate divider network 31 in quadrature phase with the $2f_S$ output signal from the non-linear circuit 29.

A novel feature in the spectral line separation employed in FIG. 1 is the use of the FIR digital bandpass filter 27 for selecting the $f_S/2$ spectral line, rather than the analog bandpass filter used in the prior art. The FIR digital bandpass filter 27 is a tracking filter, since the center frequency of its passband is determined by the frequency of the sample clock oscillator 30 oscillations. The sample clock oscillator 30 is a stable oscillator, typically being crystal stabilized, and its AFPC range is small enough to avoid phase locking to the $f_S/3$ or $f_S/4$ spectral line in the envelope detector output signal. The use of an FIR digital bandpass filter 27 eliminates the phase shifting close to $f_S/2$ spectral line that is a problem with a narrowband analog bandpass filter. The digital-to-analog conversion of the digital bandpass filter 27 response avoids having to sample at more than $2f_S$ sample rate. If harmonics of the $f_S/2$ spectral line are generated in the digital regime, higher sampling rate is required in order not to undersample the harmonic components. Alternative designs are possible in which the clock rate divider network 31 is modified to generate sampling clock signals at $f_S/2$ sample rate to be compared with the $f_S/2$ spectral line in the DAC 28 output signal in a modified AFPC detector 32. However, care must be taken to forestall jitter between the sampling clock signals which tends to arise in the chain of flip-flops used in the clock rate divider network 31. Ripple carry should be avoided in favor of clocked state transitions, for example.

Synchronization using the spectral line method for passband signals is not readily compatible with synchronization using data segment synchronization (DSS) codes as described by R. W. Citta, D. M. Mutzabaugh and G. J. Sgrignoli in U.S. Pat. No. 5,416,524 issued May 16, 1995 and entitled "DIGITAL TELEVISION SYNCHRONIZATION SYSTEM AND METHOD". In U.S. Pat. No. 5,602,595 issued Feb. 11, 1997 and entitled "ATV/MPEG SYNC SYSTEM" R. W. Citta, M. Fimoff and T. G. Laud describe the detection of DSS codes for signaling the ends of MPEG-II data packets. The DSS codes are unnecessary overhead when the spectral line method for passband signals is used for synchronization. The $f_S$ sample rate signal from the clock rate divider network 31 is supplied to a symbol counter 33 for counting the symbols in a prescribed number of data fields. The count from the symbol counter 33 is decoded by data packet start decoders 34 for determining the starts of data packets, such as MPEG-II data packets. This decoding is facilitated by the counter stages that determine the less significant bits of the symbol counter 33 count being arranged to count modulo-832 and the counter stages that determine the more significant bits of the symbol counter 33 count being arranged to count data segments.

The $2f_S$ sample rate signal from the clock rate divider network 31 is supplied to a sample counter 35 for counting the $2f_S$-rate samples in a prescribed number of data fields. Less significant bits of the count are used to address the ROM 19 that generates the complex digital carrier supplied to the complex digital multiplier 20 as its multiplier input signal. If the final I-F carrier frequency is suitably chosen modifications of the FIG. 1 circuitry that dispense with the symbol counter 33 are possible. In such modified circuitry the more significant bits of the sample count supplied from the sample counter 35 at $2f_S$ rate are used to provide symbol count at $f_S$ rate.

FIG. 1 shows the envelope detector 25 response as digitized at $2f_S$ sample rate by the ADC 26 being supplied as input signal to a PN511 match filter 36. When a PN511 sequence occurs in the initial data segment of a data field, unless there is too much interfering noise the PN511 match filter 36 response will become large enough to be detected by a threshold detector 37 thereby generating a reset command for the counters 33 and 35. The counters 33 and 35 are designed to continue counting until such a reset command is supplied even if that takes a few data fields. The counters 33 and 35 are preferably designed to count samples for a plurality of data frames before the count rolls over to implement the operation of training signal extraction circuitry 38.

The envelope detector 25 response as digitized at $2f_S$ sample rate by the ADC 26 is applied to the training signal extraction circuitry 38 as its input signal. The training signal extraction circuitry 38 is conditioned by certain sample counts from the sample counter 35 to extract training signal for the channel equalization filtering from the data field synchronization codes in the initial data segments of data fields. Accumulation of training signal samples over a cycle of six data fields or a plurality of such cycles helps suppress artifacts of NTSC co-channel interference.

Figure 2:
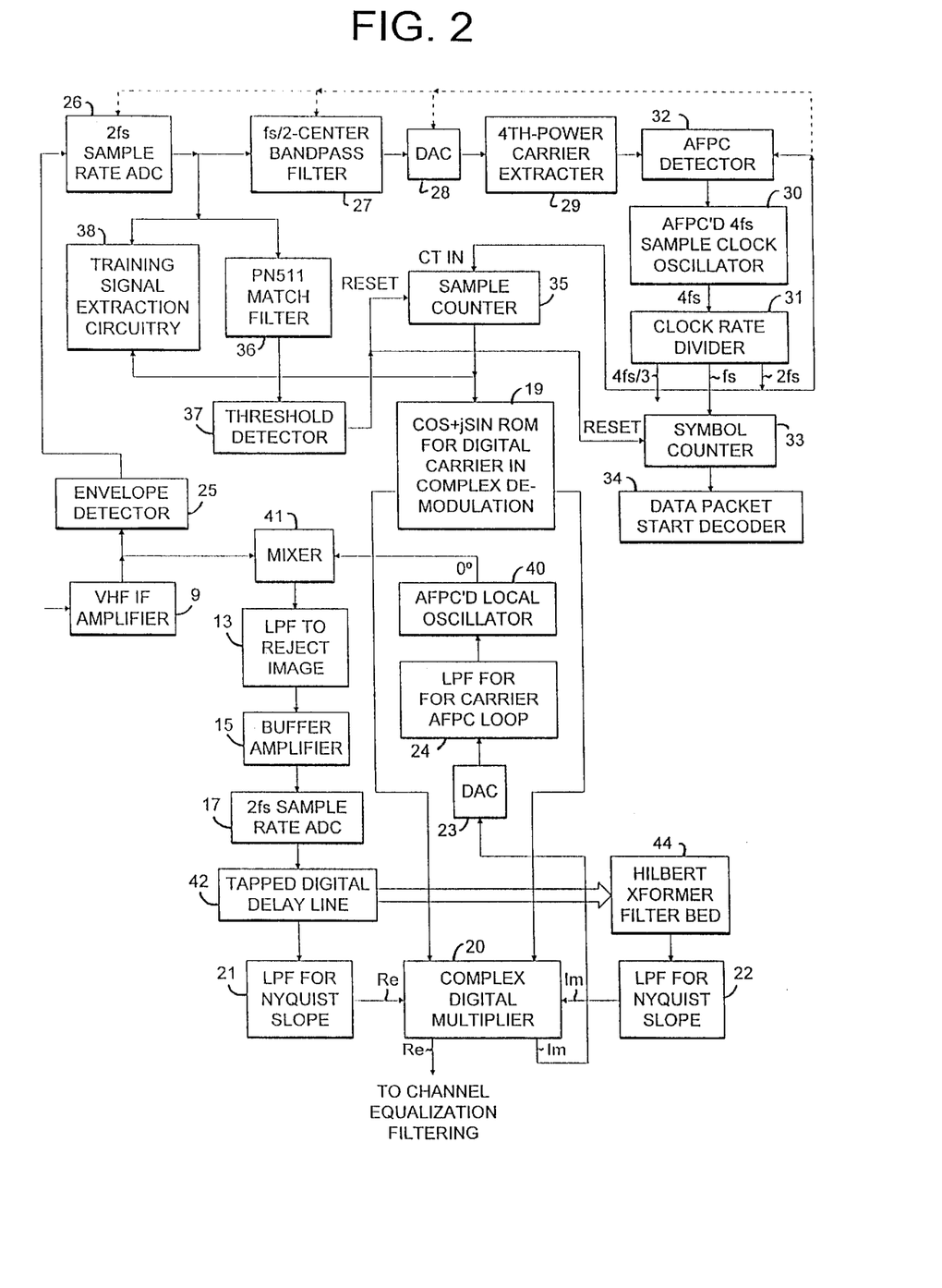
FIG. 2 is a block schematic diagram of portions of a vestigial-sideband digital television receiver embodying the invention, which VSB DTV receiver portions generate only real final intermediate-frequency signals, which are digitized and then converted to complex digital intermediate-frequency signals for demodulation in the digital regime at twice symbol rate.

FIG. 2 shows a modification of the FIG. 1 portions of a VSB DTV receiver which does not use the local oscillator 10 to supply complex local oscillations to the mixers 11 and 12 for generating complex final I-F signals. Rather, a local oscillator 40 supplies only real local oscillations to a mixer 41 for heterodyning with the VHF I-F amplifier 9 output signal to generate only real final I-F signals. These real final I-F signals are the input signal to the lowpass analog filter 13. The lowpass analog filter 14, the buffer amplifier 16 and the ADC 18 are not used in the FIG. 2 portions of a VSB DTV receiver. The output signal from the ADC 17 is supplied to a tapped digital delay line 42 as input signal thereto. The taps of the delay line 42 supply successive digital samples for weighted summation in a Hilbert transformer filter bed 44 that supplies input signal to the digital lowpass filter 22. The input signal to the digital lowpass filter 22 is supplied from a median delay tap of the delay line 42.

Figure 3:
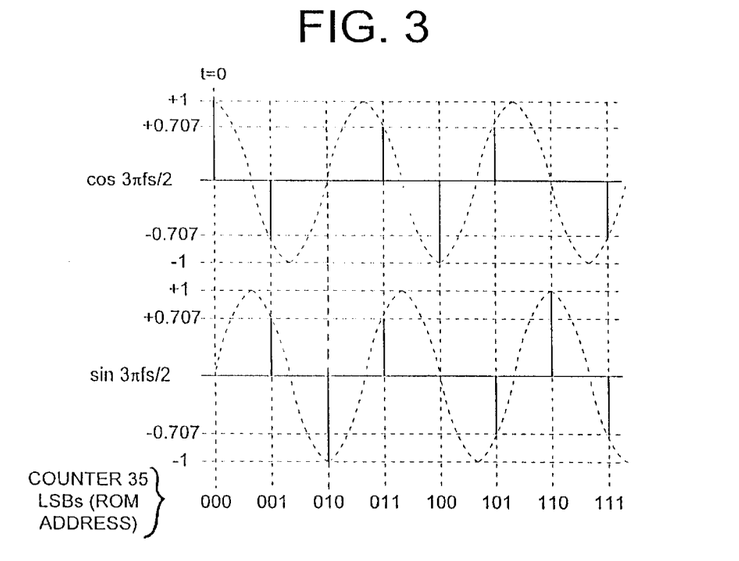
FIG. 3 is a map of the contents of a read-only memory with eight addressed locations for storing a complex carrier of frequency three-fourths symbol rate, as digitized at a sample rate twice symbol rate.

FIG. 3 is an illustrative map of the contents of the ROM 19 supposing it to have eight addressed locations for storing a complex carrier of frequency three-fourths symbol rate, as digitized at a sample rate twice symbol rate. The contents are indicated in decimal arithmetic, but will in fact be stored as signed binary numbers such as two's complement numbers. These contents cause ROM 19 to generate a particular phasing of the complex carrier of frequency three-fourths symbol rate, and the ROM 19 will contain different contents if it is to generate a different =phasing of that complex carrier. When the ROM 19 stores $3f_S/4$ complex digital carrier as illustrated in FIG. 3, the ROM 19 is addressed with the three least significant bits of the sample count from the sample counter 35. Discarding the least significant bit of the sample count from the sample counter 35 will provide symbol count needed by circuitry such as the data packet start decoders 34, allowing the symbol counter 33 to be dispensed with.

Figure 4:
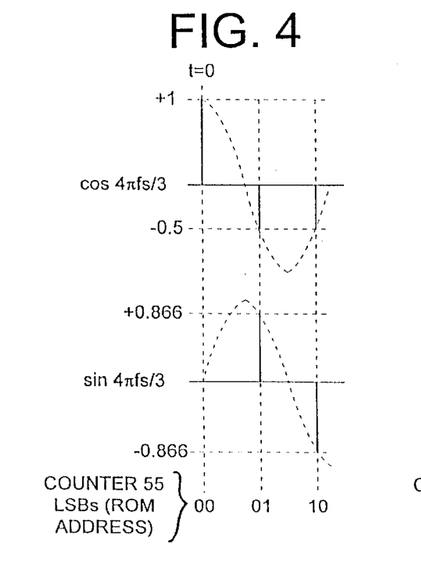
FIG. 4 is a map of the contents of a read-only memory with three addressed locations for storing a complex carrier of frequency two-thirds symbol rate, as digitized at a sample rate twice symbol rate.

FIG. 4 is an illustrative map of the contents of the ROM 19 supposing it to have three addressed locations for storing a complex carrier of frequency two-thirds symbol rate, as digitized at a sample rate twice symbol rate. The contents are indicated in decimal arithmetic, but will in fact be stored as signed binary numbers such as two's complement numbers. These contents cause ROM 19 to generate a particular phasing of the complex carrier of frequency two-thirds symbol rate, and the ROM 19 will contain different contents if it is to generate a different phasing of that complex carrier. When the ROM 19 stores $2f_S/3$ complex digital carrier in three addressed storage locations as illustrated in FIG. 4, the ROM 19 is addressed with the two least significant bits of the sample count from the sample counter 35. Accordingly, the sample counter 35 is arranged so the stages generating the two least significant bits of its sample count will count on a modulo-three basis rather than the customary modulo-four basis. Symbol count is not easily extracted from such sample count, so the symbol counter 33 is relied on for supplying symbol count to circuitry such as the data packet start decoders 34.

Figure 5:
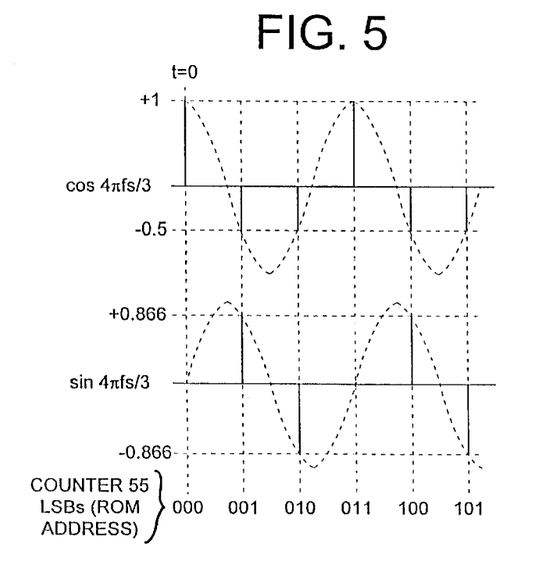
FIG. 5 is a map of the contents of a read-only memory with six addressed locations for storing a complex carrier of frequency two-thirds symbol rate, as digitized at a sample rate twice symbol rate.

FIG. 5 is an illustrative map of the contents of the ROM 19 supposing it to have six addressed locations for storing a complex carrier of frequency two-thirds symbol rate, as digitized at a sample rate twice symbol rate. The contents are indicated in decimal arithmetic, but will in fact be stored as signed binary numbers such as two's complement numbers. These contents cause ROM 19 to generate a particular phasing of the complex carrier of frequency two-thirds symbol rate, and the ROM 19 will contain different contents if it is to generate a different phasing of that complex carrier. When the ROM 19 stores $2f_S/3$ complex digital carrier in six addressed storage locations as illustrated in FIG. 5, the ROM 19 is addressed with the three least significant bits of the sample count from the sample counter 35. Accordingly, the sample counter 35 is arranged so the stages generating the three least significant bits of its sample count will count on a modulo-six basis rather than the customary modulo-eight basis. Symbol count is easily extracted from such sample count by discarding the least significant bit. So the symbol counter 33 is not necessary for supplying symbol count to circuitry such as the data packet start decoders 34 and can be dispensed with.

A substantial difference of the ROM 19 used in the circuitry of FIGS. 1 and 2 from the complex-digital-carrier ROM used in the phase tracker described in U.S. Pat. No. 5,479,449 is that only one particular phasing of the complex carrier is stored, rather than several phasings. This provides a substantial saving in the storage capacity required of the complex-digital-carrier ROM.

Figure 6:
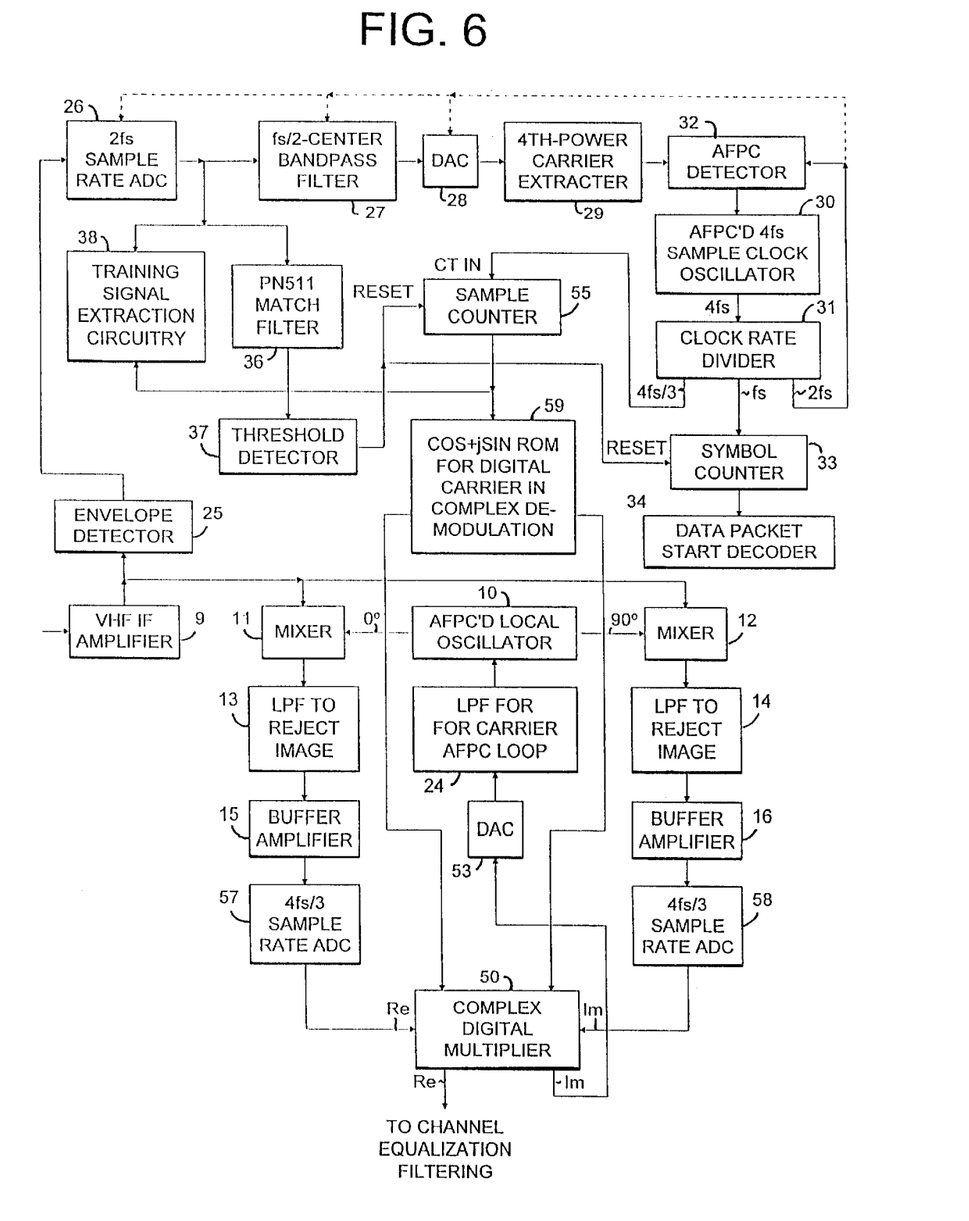
FIG. 6 is a block schematic diagram of portions of a vestigial-sideband digital television receiver embodying the invention, which VSB DTV receiver portions generate complex final intermediate-frequency signals, which are digitized by complex analog-to-digital conversion circuitry for demodulation in the digital regime at four-thirds symbol rate.

FIG. 6 shows a modification of the FIG. 1 portions of a VSB DTV receiver in which the local oscillator 10 supplies complex local oscillations to the mixers 11 and 12 for generating complex final I-F signals. However, the complex final I-F signals are digitized at four-thirds symbol rate, rather than twice symbol rate, for demodulation in the digital regime. More particularly, the cascaded ADC 17 and digital lowpass filter 21 are replaced by an analog-to-digital converter 57 that samples at four-thirds symbol rate, and the cascaded ADC 18 and digital lowpass filter 22 are replaced by an analog-to-digital converter 58 that samples at four-thirds symbol rate. If the final I-F carrier frequency is caused to be two-thirds symbol rate or 7.17 MHz, the four-thirds symbol rate sampling by ADCs 57 and 58 aliases the vestigial sideband into the full sideband, supposing the anti-aliasing filtering normally included in the ADCs has a high enough cut-off frequency. This eliminates the need for Nyquist slope filtering at the carrier end of the final I-F signal. The lowpass filters 13 and 14 can be designed to function as anti-aliasing filters.

The complex digital multiplier 50 and the DAC 53 of FIG. 6 are clocked at four-thirds symbol rate, rather than at being clocked at twice symbol rate like the complex digital multiplier 20 and the DAC 23 of FIG. 1. The ROM 19 of FIG. 1 addressed at twice symbol rate by sample count from sample counter 35 and used for generating complex digital carrier to implement the final I-F signal being synchrodyned to baseband is replaced by read-only memory 59 in FIG. 6. The sample counter 35 of FIG. 1 used for counting samples at twice symbol rate is replaced in FIG. 6 by a sample counter 55 that counts samples at four-thirds symbol rate for addressing the ROM 59.

Figure 7:
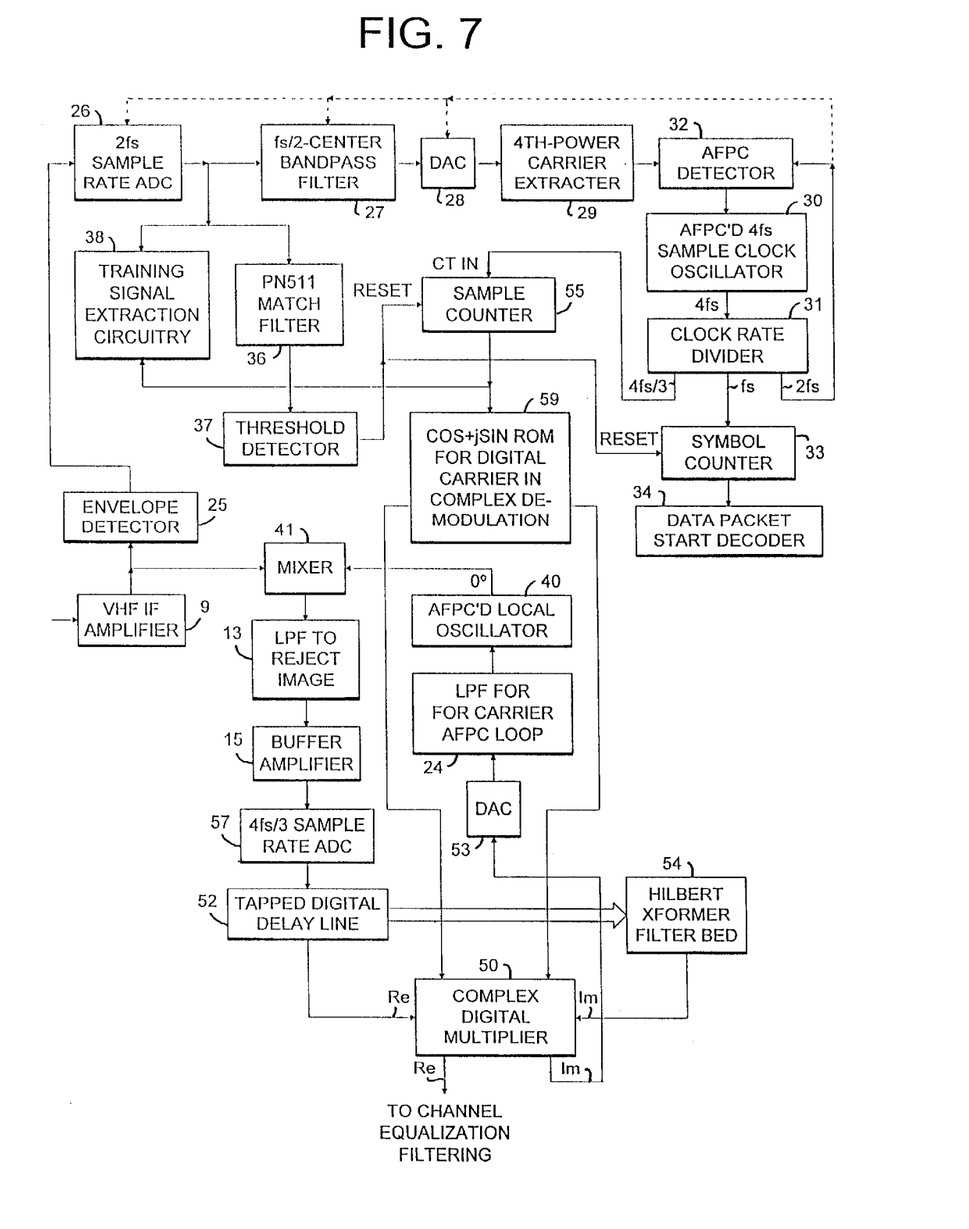
FIG. 7 is a block schematic diagram of portions of a vestigial-sideband digital television receiver embodying the invention, which VSB DTV receiver portions generate only real final intermediate-frequency signals, which are digitized and then converted to complex digital intermediate-frequency signals for demodulation in the digital regime at four-thirds symbol rate.

FIG. 7 shows a modification of the FIG. 6 portions of a VSB DTV receiver which does not use the local oscillator 10 to supply complex local oscillations to the mixers 11 and 12 for generating complex final I-F signals. Rather, the local oscillator 40 supplies only real local oscillations to the mixer 41 for heterodyning with the VHF I-F amplifier 9 output signal to generate only real final I-F signals. These real final I-F signals are the input signal to the lowpass analog filter 13. The lowpass analog filter 14, the buffer amplifier 16 and the ADC 58 are not used in the FIG. 7 portions of a VSB DTV receiver. The output signal from the ADC 57 is supplied to a tapped digital delay line 52 as input signal thereto. The taps of the delay line 52 supply successive digital samples for weighted summation in a Hilbert transformer filter bed 54 that supplies its response directly to the complex digital multiplier 50 as the imaginary component of its multiplicand input signal. The real component of that multiplicand input signal is supplied from a median delay tap of the delay line 52.

Figure 8:
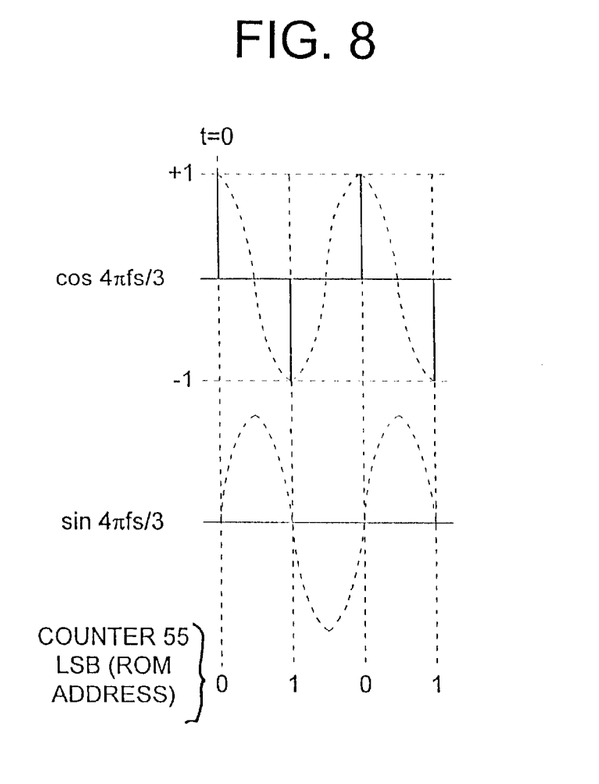
FIG. 8 is a map of the contents of a read-only memory with two addressed locations for storing a complex carrier of frequency two-thirds symbol rate, as digitized at a sample rate four-thirds symbol rate.
Figure 9:
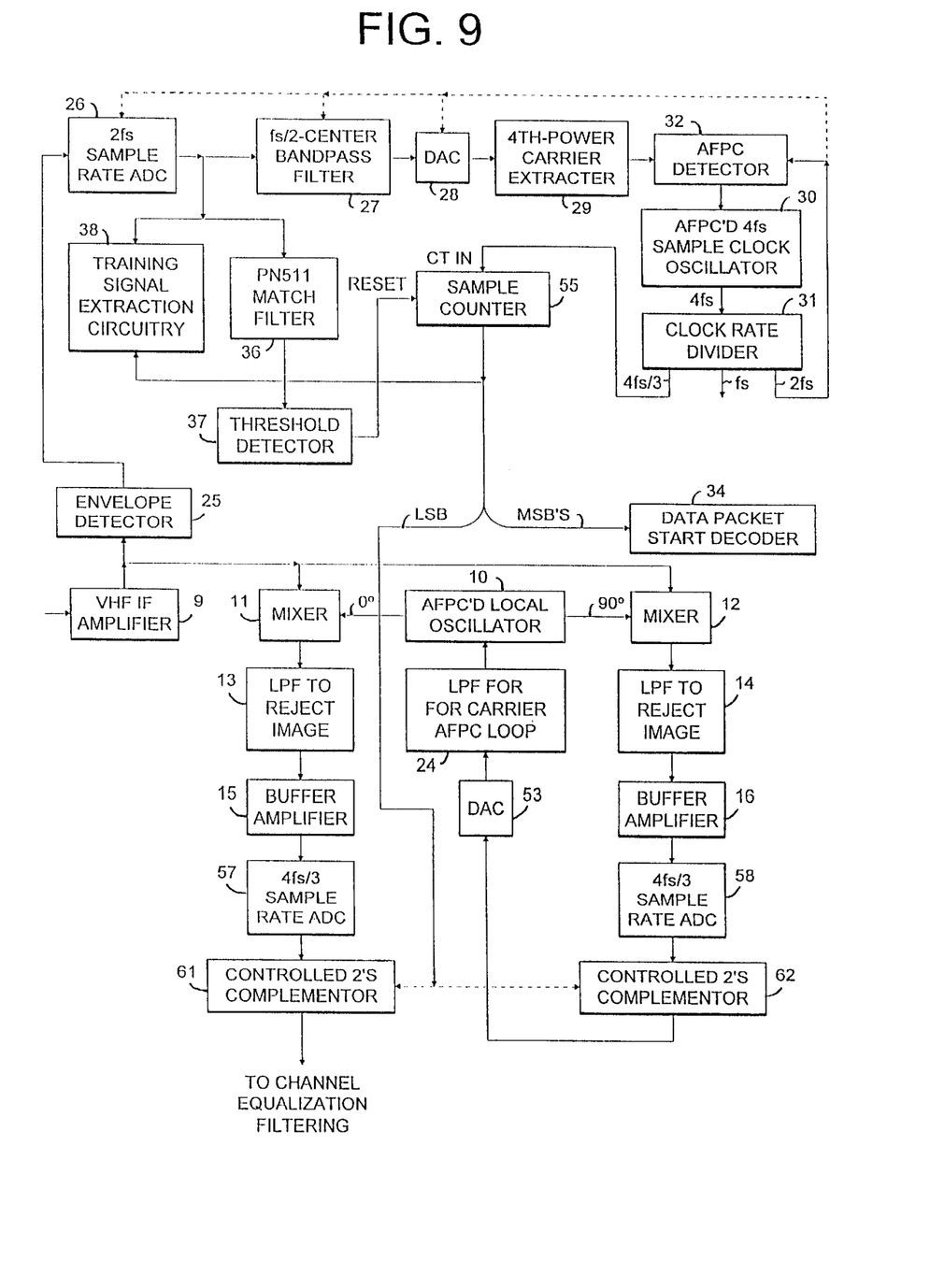
FIG. 9 is a block schematic diagram of a modification of the portions of a vestigial-sideband digital television receiver shown in FIG. 6, which modifications are made in accordance with a further aspect of the invention.
Figure 10:
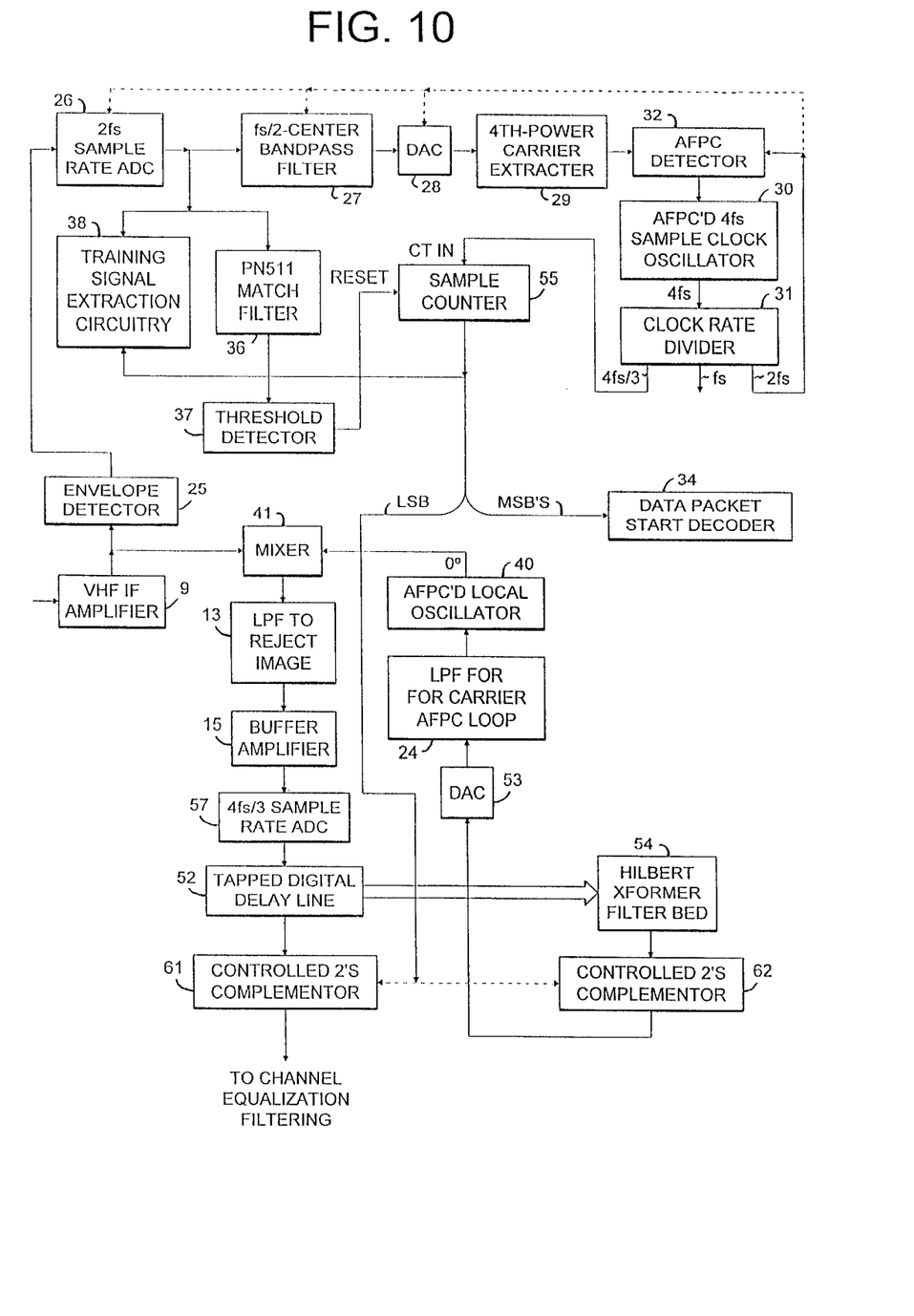
FIG. 10 is a block schematic diagram of a modification of the portions of a vestigial-sideband digital television receiver shown in FIG. 7, which modifications are made in accordance with a further aspect of the invention.

FIG. 8 is an illustrative map of the contents of the ROM 59 supposing it to have two addressed locations for storing a complex carrier of frequency two-thirds symbol rate, as digitized at a sample rate four-thirds symbol rate. Observe that the $\cos(4\pi f_S/3)$ term for the selected phasing alternates between +1 and −1 at four-thirds symbol rate and can be completely described by the least significant bit of the sample counter 35 count output signal. Observe further that the $\sin(4\pi f_S/3)$ term for the selected phasing has zero value. These observations provide the foundation for understanding that the circuitry of FIG. 6 and the circuitry of FIG. 7 can be simplified as shown in FIGS. 9 and 10 respectively. The component digital multipliers in the complex digital multiplier 50 that would be used for multiplying digitized complex final I-F signal by the imaginary component of digital carrier in the synchrodyning process multiply by zero, so these digital multipliers can be dispensed with. Also there is no need for the digital adder and the digital subtractor used to combine the products from these digital multipliers with the products from the digital multipliers used for multiplying digitized complex final I-F signal by the real component of digital carrier. (The deletion of these two digital multipliers, the digital adder and the digital subtractor is possible because the bandpass trackers of the invention use only a single phasing of complex digital carrier, rather than a plurality of phasings one of which is selected to achieve symbol synchronization.) The digital multipliers used for multiplying digitized complex final I-F signal by the real component of digital carrier alternately multiply by +1 and −1, so they can simply comprise selective complementors for the real and imaginary components of the digitized complex final I-F signal. The alternating +1 and −1 samples of multiplier signal can be supplied in direct reliance on the least significant bit of the sample counter 55 count output signal without need for the ROM 59.

FIG. 9 shows a simplification of the FIG. 6 circuitry in which the complex digital multiplier 50 is replaced by controlled two's complementors 61 and 62. The controlled two's complementor 61 selectively two's complements the ADC 57 output signal to generate the real component of demodulated final I-F signal to be supplied to channel equalization circuitry. The controlled two's complementor 62 selectively two's complements the ADC 58 output signal to generate the imaginary component of demodulated final I-F signal to be supplied to DAC 53 and the following lowpass filter 24 to develop AFPC signal for the local oscillator 10. More particularly, the controlled two's complementor 61 response two's complements the ADC 57 output signal when the least significant bit of the sample counter 55 count output signal is a ONE and otherwise reproduces complements the ADC 57 output signal without complementation. The controlled two's complementor 62 response two's complements the ADC 58 output signal when the least significant bit of the sample counter 55 count output signal is a ONE and otherwise reproduces complements the ADC 58 output signal without complementation. The symbol counter 33 is dispensed with, and the more significant bits of the sample counter 55 count output signal provide the symbol count to circuitry such as the data packet start decoders 34.

FIG. 10 shows a simplification of the FIG. 7 circuitry in which the complex digital multiplier 50 is replaced by controlled two's complementors 61 and 62. The controlled two's complementor 61 selectively two's complements the ADC 57 output signal as subjected to median delay by the tapped digital delay line 52, thereby generating the real component of demodulated final I-F signal to be supplied to channel equalization circuitry. The controlled two's complementor 62 selectively two's complements the weighted sum output signal of the Hilbert transform filter bed 54, thereby generating the imaginary component of demodulated final I-F signal. This imaginary component of demodulated final I-F signal is supplied to the cascade of DAC 53 and the lowpass filter 24 to develop AFPC signal for the local oscillator 10.

The principles of operation used in the circuitry of FIGS. 6, 7, 9 and 10 can be used wherever the sampling frequency used during digital synchrodyning is twice the carrier frequency of the digital final I-F signal, one should appreciate. For example, if the sampling frequency is twice symbol rate, the carrier frequency of the digital final I-F signal can be selected to be the same as the symbol frequency. This avoids the need for the Nyquist-slope lowpass filters 21 and 22 of FIGS. 1 and 2. The complex digital multiplier 20 of FIGS. 1 and 2 can be replaced by a pair of controlled two's complementors that are controlled by the least significant bit of the sample counter 35 count output signal. This permits the ROM 19 to be dispensed with.

The asymmetry of the sidebands of the VSB DTV signal in the carrier region can give rise to a problem of carrier jitter if there are appreciable changes in the energy low-frequency modulating signal components. These problems have been alleviated in the prior art by using auxiliary phase tracking circuitry after the bandpass equalizer. A different approach used by Samsung Electronics engineers arranges for the carrier to be at the low end of the frequency spectrum of the final I-F signal supplied for digitization, so the lowpass filtering used to reject images of the final I-F signal in the downconversion from VHF I-F band can be designed to reduce asymmetry of the sidebands of the VSB DTV signal in the carrier region.

Figure 11:
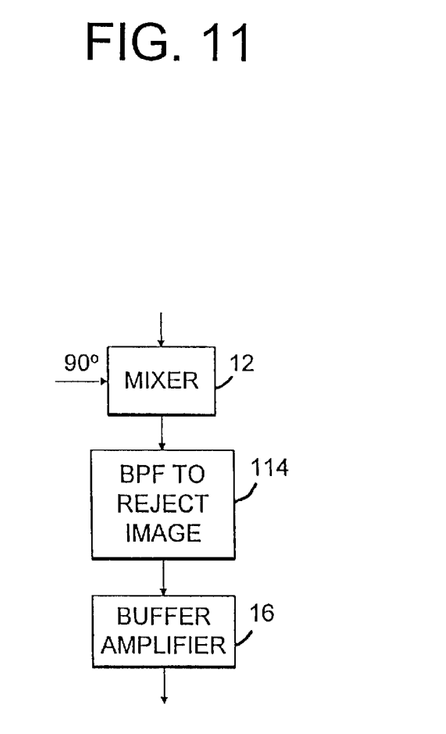
FIG. 11 is a block schematic diagram of a modification that can be made to the portions of a vestigial-sideband digital television receiver shown in FIG. 1 or shown in FIG. 9 to improve the characteristics of an automatic frequency and phase control feedback loop thereof.

FIG. 11 shows an a modification that can be made to the portions of a vestigial-sideband digital television receiver shown in FIG. 1 or shown in FIG. 9 to improve the characteristics of the AFPC feedback loop for the local oscillator 10 in yet another way. Rather than using a lowpass filter 14 after the mixer 12 for rejecting the image of the final I-f signal, a bandpass filter 114 is used instead for selecting the carrier frequency and close-by frequencies as input signal for the buffer amplifier 16 that drives the following ADC 18 or 58. The bandpass filter 114 is designed to have asymmetrical response complementary to the asymmetry of the VSB signal in the region of the carrier frequency.

What is claimed is:

1. A bandpass phase tracker for automatically sampling at prescribed phases of digital carrier when digitizing a vestigial-sideband intermediate-frequency signal received from an intermediate-frequency amplifier, which said vestigial-sideband intermediate-frequency signal is modulated in accordance with a baseband symbol code of a prescribed symbol rate, said bandpass phase tracker comprising:

a local oscillator for generating analog oscillations at a frequency and phase responsive to an automatic frequency and phase control signal;

heterodyning circuitry for mixing oscillations from said local oscillator with said vestigial-sideband intermediate-frequency signal received from an intermediate-frequency amplifier to generate an analog low-frequency heterodyne signal with its lowest frequencies offset from zero frequency;

analog-to-digital conversion circuitry for sampling said analog low-frequency heterodyne signal in accordance with a first sampling clock signal and converting the resulting samples to a complex digital low-frequency heterodyne signal having real and imaginary components;

digital demodulation circuitry for synchrodyning said complex digital low-frequency heterodyne signal with a digital carrier signal to generate real and imaginary components of a demodulated signal at baseband;

circuitry responsive to the imaginary component of said demodulated signal for generating an automatic frequency and phase control signal for said local oscillator;

an envelope detector for detecting envelope variations in said vestigial-sideband intermediate-frequency signal received from an intermediate-frequency amplifier to supply an envelope detector response;

a frequency-selective filter for receiving said envelope detector response as its input signal and selectively responding in its output signal to frequencies in its input signal that are proximate to a submultiple of said prescribed symbol rate;

sampling clock signal generating circuitry for responding to said submultiple of said prescribed symbol rate contained in the output signal from said frequency-selective filter to generate said first sampling clock signal and a second sampling clock signal, each at a respective controlled rate that is a rational multiple of said submultiple of said prescribed symbol rate; and a carrier signal generator for generating said digital carrier signal for synchrodyning with said complex digital low-frequency heterodyne signal, with the frequency and phase of said digital carrier being controlled by said second sampling clock signal.

2. The bandpass phase tracker of claim 1; wherein said digital demodulation circuitry comprises a complex digital multiplier for synchrodyning said complex digital low-frequency heterodyne signal to baseband by multiplying it by said complex digital carrier signal; and wherein said carrier signal generator comprises a sample counter, for counting the sample periods in said second sampling clock signal to supply a modular count, and read-only memory addressed by said modular count, for generating real and imaginary components of said digital carrier signal as generated as a complex digital carrier signal.

3. The bandpass phase tracker of claim 2, wherein the respective controlled rates of said first sampling clock and said second sampling clock are each twice said symbol rate.

4. The bandpass phase tracker of claim 2, wherein the respective controlled rate of said first sampling clock is twice said symbol rate and the respective controlled rate of said second sampling clock is four-thirds said symbol rate.

5. The bandpass phase tracker of claim 2, wherein the respective controlled rate of said second sampling clock is twice said symbol rate and said digital carrier is at a frequency three-fourths said symbol rate.

6. The bandpass phase tracker of claim 2, wherein the respective controlled rate of said second sampling clock is twice said symbol rate and said digital carrier is at a frequency two-thirds said symbol rate.

7. The bandpass phase tracker of claim 2, wherein the respective controlled rate of said second sampling clock is four-thirds said symbol rate and said digital carrier is at a frequency two-thirds said symbol rate.

8. The bandpass phase tracker of claim 2, further comprising:

filter circuitry connected for rolling off the system frequency response of said complex low-frequency heterodyne signal with a Nyquist slope through the carrier region of said low-frequency heterodyne signal, before said complex digital low-frequency heterodyne signal is supplied to said complex digital multiplier to be synchrodyned to baseband by being multiplied by a complex digital carrier signal.

9. The bandpass phase tracker of claim 2, wherein said local oscillator supplies local oscillations of a first phase, and wherein said heterodyning circuitry comprises:

a first mixer for multiplying said vestigial-sideband intermediate-frequency signal received from said intermediate-frequency amplifier by said local oscillations of said first phase, to generate a first mixer output signal; and a first analog lowpass filter connected for providing a first analog lowpass filter response to said first mixer output signal and supplying said first analog lowpass filter response to said analog-to-digital conversion circuitry for digitization, thereby implementing the generation of the real component of said complex digital low-frequency heterodyne signal.

10. The bandpass phase tracker of claim 9, wherein said local oscillator also supplies local oscillations of a second phase in quadrature relationship with local oscillations of said first phase, and wherein said heterodyning circuitry further comprises:

a second mixer for multiplying said vestigial-sideband intermediate-frequency signal received from said intermediate-frequency amplifier by said local oscillations of said second phase, to generate a second mixer output signal; and a second analog lowpass filter connected for providing a second analog lowpass filter response to said second mixer output signal and supplying said second analog lowpass filter response to said analog-to-digital conversion circuitry for digitization, thereby implementing the generation of the imaginary component of said complex digital low-frequency heterodyne signal.

11. The bandpass phase tracker of claim 10, wherein said analog-to-digital conversion circuitry comprises:

a first analog-to-digital converter connected for digitizing the response of said first analog lowpass filter at said controlled rate to generate the real component of said complex digital low-frequency heterodyne signal; and a second analog-to-digital connected for digitizing the response of said second analog lowpass filter at said controlled rate to generate the imaginary component of said complex digital low-frequency heterodyne signal.

12. The bandpass phase tracker of claim 11, further comprising:

a first digital lowpass filter connected for rolling off the system frequency response of the real component of said complex digital low-frequency heterodyne signal with a Nyquist slope through the carrier region of said low-frequency heterodyne signal, before said real component of said complex digital low-frequency heterodyne signal is supplied to said complex digital multiplier to be synchrodyned to baseband; and a second digital lowpass filter connected for rolling off the system frequency response of the imaginary component of said complex digital low-frequency heterodyne signal with a Nyquist slope through the carrier region of said low-frequency heterodyne signal, before said imaginary component of said complex digital low-frequency heterodyne signal is supplied to said complex digital multiplier to be synchrodyned to baseband.

13. The bandpass phase tracker of claim 2, wherein said analog-to-digital conversion circuitry comprises:

an analog-to-digital converter connected for digitizing the response of said first analog lowpass filter at said controlled rate to generate digitized analog lowpass filter response; and wherein said heterodyning circuitry further comprises:

phase-splitting circuitry connected for supplying said complex digital low-frequency heterodyne signal having real and imaginary components in response to said digitized analog lowpass filter response.

14. The bandpass phase tracker of claim 13, further comprising:

a first digital lowpass filter connected for rolling off the system frequency response of the real component of said complex digital low-frequency heterodyne signal with a Nyquist slope through the carrier region of said low-frequency heterodyne signal, before said real component of said complex digital low-frequency heterodyne signal is supplied to said complex digital multiplier to be synchrodyned to baseband; and a second digital lowpass filter connected for rolling off the system frequency response of the imaginary component of said complex digital low-frequency heterodyne signal with a Nyquist slope through the carrier region of said low-frequency heterodyne signal, before said imaginary component of said complex digital low-frequency heterodyne signal is supplied to said complex digital multiplier to be synchrodyned to baseband.

15. The bandpass phase tracker of claim 14, wherein said phase-splitting circuitry comprises:

a tapped digital delay line connected to receive said digitized analog lowpass filter response, connected to supply a set of tap signals from successive taps thereof that reproduce said digitized analog lowpass filter response with progressively greater incremental delay, and connected to supply a tap signal with an intermediate amount of delay as said real component of said complex digital low-frequency heterodyne signal; and a Hilbert transformer filter bed connected to receive said set of tap signals from said tapped digital delay line and to supply said imaginary component of said complex digital low-frequency heterodyne signal in response to said set of tap signals.

16. The bandpass phase tracker of claim 13, wherein said phase-splitting circuitry comprises:

a tapped digital delay line connected to receive said digitized analog lowpass filter response, connected to supply a set of tap signals from successive taps thereof that reproduce said digitized analog lowpass filter response with progressively greater incremental delay, and connected to supply a tap signal with an intermediate amount of delay as said real component of said complex digital low-frequency heterodyne signal; and a Hilbert transformer filter bed connected to receive said set of tap signals from said tapped digital delay line and to supply said imaginary component of said complex digital low-frequency heterodyne signal in response to said set of tap signals.

17. The bandpass phase tracker of claim 1; wherein said carrier signal generator comprises a sample counter for counting the sample periods in said second sampling clock signal to supply a modulo-two count; and wherein said digital demodulation circuitry comprises:

a first complementor for generating said real component of said demodulated signal by selectively complementing said real component of said complex digital low-frequency heterodyne signal in response to the modulo-two count of the sample periods in said second sampling clock signal; and a second complementor for generating said imaginary component of said demodulated signal by selectively complementing said imaginary component of said complex digital low-frequency heterodyne signal in response to the modulo-two count of the sample periods in said second sampling clock signal.

18. The bandpass phase tracker of claim 17, wherein the respective controlled rate of said second sampling clock is four-thirds said symbol rate.

19. The bandpass phase tracker of claim 17, further comprising:

filter circuitry connected for rolling off the system frequency response of said complex low-frequency heterodyne signal with a Nyquist slope through the carrier region of said low-frequency heterodyne signal, before said complex digital low-frequency heterodyne signal is supplied to said digital demodulation circuitry to be synchrodyned to baseband.

20. The bandpass phase tracker of claim 17, wherein said local oscillator supplies local oscillations of a first phase, and wherein said heterodyning circuitry comprises:

a first mixer for multiplying said vestigial-sideband intermediate-frequency signal received from said intermediate-frequency amplifier by said local oscillations of said first phase, to generate a first mixer output signal; and a first analog lowpass filter connected for providing a first analog lowpass filter response to said first mixer output signal and supplying said first analog lowpass filter response to said analog-to-digital conversion circuitry for digitization, thereby implementing the generation of the real component of said complex digital low-frequency heterodyne signal.

21. The bandpass phase tracker of claim 20, wherein said local oscillator also supplies local oscillations of a second phase in quadrature relationship with local oscillations of said first phase, and wherein said heterodyning circuitry further comprises:

a second mixer for multiplying said vestigial-sideband intermediate-frequency signal received from said intermediate-frequency amplifier by said local oscillations of said second phase, to generate a second mixer output signal; and a second analog lowpass filter connected for providing a second analog lowpass filter response to said second mixer output signal and supplying said second analog lowpass filter response to said analog-to-digital conversion circuitry for digitization, thereby implementing the generation of the imaginary component of said complex digital low-frequency heterodyne signal.

22. The bandpass phase tracker of claim 21, wherein said analog-to-digital conversion circuitry comprises:

a first analog-to-digital converter connected for digitizing the response of said first analog lowpass filter at said controlled rate to generate the real component of said complex digital low-frequency heterodyne signal; and a second analog-to-digital connected for digitizing the response of said second analog lowpass filter at said controlled rate to generate the imaginary component of said complex digital low-frequency heterodyne signal.

23. The bandpass phase tracker of claim 22, further comprising:
- a first digital lowpass filter connected for rolling off the system frequency response of the real component of said complex digital low-frequency heterodyne signal with a Nyquist slope through the carrier region of said low-frequency heterodyne signal, before said real component of said complex digital low-frequency heterodyne signal is supplied to said digital demodulation circuitry to be synchrodyned to baseband; and
- a second digital lowpass filter connected for rolling off the system frequency response of the imaginary component of said complex digital low-frequency heterodyne signal with a Nyquist slope through the carrier region of said low-frequency heterodyne signal, before said imaginary component of said complex digital low-frequency heterodyne signal is supplied to said digital demodulation circuitry to be synchrodyned to baseband.

24. The bandpass phase tracker of claim 17, wherein said analog-to-digital conversion circuitry comprises:
- an analog-to-digital converter connected for digitizing the response of said first analog lowpass filter at said controlled rate to generate digitized analog lowpass filter response; and wherein said heterodyning circuitry further comprises:
- phase-splitting circuitry connected for supplying said complex digital low-frequency heterodyne signal having real and imaginary components in response to said digitized analog lowpass filter response.

25. The bandpass phase tracker of claim 24, further comprising:
- a first digital lowpass filter connected for rolling off the system frequency response of the real component of said complex digital low-frequency heterodyne signal with a Nyquist slope through the carrier region of said low-frequency heterodyne signal, before said real component of said complex digital low-frequency heterodyne signal is supplied to said digital demodulation circuitry to be synchrodyned to baseband; and
- a second digital lowpass filter connected for rolling off the system frequency response of the imaginary component of said complex digital low-frequency heterodyne signal with a Nyquist slope through the carrier region of said low-frequency heterodyne signal, before said imaginary component of said complex digital low-frequency heterodyne signal is supplied to said digital demodulation circuitry to be synchrodyned to baseband.

26. The bandpass phase tracker of claim 25, wherein said phase-splitting circuitry comprises:
- a tapped digital delay line connected to receive said digitized analog lowpass filter response, connected to supply a set of tap signals from successive taps thereof that reproduce said digitized analog lowpass filter response with progressively greater incremental delay, and connected to supply a tap signal with an intermediate amount of delay as said real component of said complex digital low-frequency heterodyne signal; and
- a Hilbert transformer filter bed connected to receive said set of tap signals from said tapped digital delay line and to supply said imaginary component of said complex digital low-frequency heterodyne signal in response to said set of tap signals.

27. The bandpass phase tracker of claim 24, wherein said phase-splitting circuitry comprises:
- a tapped digital delay line connected to receive said digitized analog lowpass filter response, connected to supply a set of tap signals from successive taps thereof that reproduce said digitized analog lowpass filter response with progressively greater incremental delay, and connected to supply a tap signal with an intermediate amount of delay as said real component of said complex digital low-frequency heterodyne signal; and
- a Hilbert transformer filter bed connected to receive said set of tap signals from said tapped digital delay line and to supply said imaginary component of said complex digital low-frequency heterodyne signal in response to said set of tap signals.

* * * * *